United States Patent
Schell et al.

(10) Patent No.: US 10,200,853 B2
(45) Date of Patent: Feb. 5, 2019

(54) MANAGEMENT SYSTEMS FOR MULTIPLE ACCESS CONTROL ENTITIES

(71) Applicant: Apple Inc., Cupertino, CA (US)

(72) Inventors: Stephan V. Schell, San Mateo, CA (US); David T. Haggerty, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 14/814,486

(22) Filed: Jul. 30, 2015

(65) Prior Publication Data

US 2016/0044495 A1 Feb. 11, 2016

Related U.S. Application Data

(63) Continuation of application No. 13/079,614, filed on Apr. 4, 2011, now Pat. No. 9,100,810.

(60) Provisional application No. 61/407,861, filed on Oct. 28, 2010.

(51) Int. Cl.
*H04W 8/20* (2009.01)

(52) U.S. Cl.
CPC .................. *H04W 8/205* (2013.01)

(58) Field of Classification Search
CPC .................. H04W 8/205
See application file for complete search history.

(56) References Cited

U.S. PATENT DOCUMENTS

| | | | |
|---|---|---|---|
| 6,052,604 A | 4/2000 | Bishop et al. | |
| 2002/0197991 A1* | 12/2002 | Anvekar | H04B 7/18504 455/431 |
| 2004/0176134 A1 | 9/2004 | Goldthwaite et al. | |
| 2004/0204089 A1 | 10/2004 | Castrogiovanni et al. | |
| 2005/0164737 A1 | 7/2005 | Brown | |
| 2007/0153768 A1 | 7/2007 | Jagadesan et al. | |
| 2007/0177562 A1 | 8/2007 | Castrogiovanni et al. | |

(Continued)

FOREIGN PATENT DOCUMENTS

| | | |
|---|---|---|
| DE | 10215861 A1 | 8/2003 |
| EP | 2076071 A1 | 7/2009 |
| KR | 1020100050565 A | 5/2010 |

OTHER PUBLICATIONS

Chinese Application for Invention No. 201180058667.1—Second Office Action dated Mar. 1, 2016.

(Continued)

*Primary Examiner* — Mazda Sabouri
(74) *Attorney, Agent, or Firm* — Dickinson Wright RLLP

(57) ABSTRACT

Methods and apparatus for managing multiple user access control entities or clients. For example, in one embodiment, a "wallet" of electronic subscriber identity modules (eSIMs) may be stored and used at a user device and/or distributed to other devices for use thereon. In another embodiment, a networked server may store and distribute eSIM to a plurality of user devices in communication therewith. A database of available eSIM is maintained at the wallet entity and/or at the network which enables request for a particular eSIM to be processed and various rules for the distribution thereof to be implemented. Security precautions are implemented to protect both user and network carrier specific data as the data is transmitted between networked entities. Solutions for eSIM backup and restoration are also described.

21 Claims, 10 Drawing Sheets

(56) References Cited

U.S. PATENT DOCUMENTS

| | | |
|---|---|---|
| 2008/0243699 A1 | 10/2008 | Hilerio et al. |
| 2008/0261561 A1* | 10/2008 | Gehrmann ............ H04W 8/205 |
| | | 455/411 |
| 2009/0163175 A1 | 6/2009 | Shi et al. |
| 2010/0029247 A1 | 2/2010 | De Atley et al. |
| 2010/0210304 A1 | 8/2010 | Huslak |
| 2010/0210306 A1 | 8/2010 | Larsson |
| 2010/0311418 A1* | 12/2010 | Shi ....................... H04W 48/18 |
| | | 455/432.1 |
| 2010/0311468 A1 | 12/2010 | Shi et al. |

OTHER PUBLICATIONS

Korean Patent Application No. 10-2015-7000874—Notice of Preliminary Rejection dated Mar. 17, 2016.
Korean Patent Application No. 10-2013-7013622—Office Action dated Aug. 13, 2014.
Taiwanese Patent Application No. 100138901—Office Action dated Apr. 29, 2014.
European Patent Application No. 11793892.8—Communication Pursuant to Article 94(3) EPC dated Oct. 30, 2015.
Korean Patent Application No. 10-2015-7000874—Final Rejection dated Sep. 29, 2016.

* cited by examiner

| DESCRIPTION | SUBSCRIBER | STATUS INDICATOR | AUTHORIZED DEVICE(S) |
|---|---|---|---|
| [eSIM 1] | Subscriber 1 | In use | Device A |
| [eSIM 2] | Subscriber 1 | Held | Device A |
| [eSIM 3] | Subscriber 1 | Held | Device A |
| [eSIM 4] | Subscriber 2 | In use | Device B |
| [eSIM 5] | Subscriber 2 | Not available | Device C |
| [eSIM 6] | Subscriber 3 | In use<br>In use | Device D<br>Device E |
| [eSIM 7] | Subscriber 3 | Available | Device D |

FIG. 8

MANAGEMENT SYSTEMS FOR MULTIPLE ACCESS CONTROL ENTITIES

CROSS-REFERENCE TO RELATED APPLICATIONS

This application is a continuation of U.S. patent application Ser. No. 13/079,614, filed Apr. 4, 2011, entitled "MANAGEMENT SYSTEMS FOR MULTIPLE ACCESS CONTROL ENTITIES," now U.S. Pat. No. 9,100,810 issued Aug. 4, 2015, which claims the benefit of U.S. Provisional Patent Application Ser. No. 61/407,861, filed Oct. 28, 2010, entitled "MANAGEMENT SYSTEMS FOR MULTIPLE ACCESS CONTROL ENTITIES," the contents of which are incorporated herein by reference in their entirety for all purposes.

FIELD

The present invention relates generally to the field of communications systems, and, more particularly in one exemplary aspect to wireless systems that allow user equipment to authenticate to wireless networks (e.g., cellular networks, WLANs, etc.) using access control clients.

BACKGROUND

Access control is required for secure communication in most prior art wireless radio communication systems. As an example, one simple access control scheme might comprise: (1) verifying the identity of a communicating party, and (ii) granting a level of access commensurate with the verified identity. Within the context of an exemplary cellular system (e.g., Universal Mobile Telecommunications System (UMTS)), access control is governed by an access control client, referred to as a Universal Subscriber Identity Module (USIM) executing on a physical Universal Integrated Circuit Card (UICC). The USIM access control client authenticates the subscriber to the UMTS cellular network. After successful authentication, the subscriber is allowed access to the cellular network. As used hereinafter, the term "access control client" refers generally to a logical entity, either embodied within hardware or software, suited for controlling access of a first device to a network. Common examples of access control clients include the aforementioned USIM, CDMA Subscriber Identification Modules (CSIM), IP Multimedia Services Identity Module (ISIM), Subscriber Identity Modules (SIM), Removable User Identity Modules (RUIM), etc.

Traditionally, the USIM (or more generally "SIM") performs the well-known Authentication and Key Agreement (AKA) procedure, which verifies and decrypts the applicable data and programs to ensure secure initialization. Specifically, the USIM must both (i) successfully answer a remote challenge to prove its identity to the network operator, and (ii) issue a challenge to verify the identity of the network.

When a SIM card is manufactured, the SIM card is programmed with carrier-specific authentication information that restricts the use of that SIM card to a particular carrier. If a user wishes to change services from the existing carrier to a new carrier, the user needs to replace their SIM card with a new SIM card programmed in a similar way, but for the different carrier.

However, existing SIM solutions have multiple weaknesses and shortcomings. For example, the SIM software is hard-coded to the physical SIM card media; consequently, subscribers need new SIM cards to change SIM operation. In an effort to reduce the inconvenience of swapping cards, some cards are preloaded with two accounts. The user can switch between the two accounts without physically removing the card. However, the user of this type of SIM card will still need a new card to add new accounts.

Similarly, some user devices have multiple card slots; however, supporting multiple card receptacles is bulky, and none-the-less requires an actual SIM card for operation. Moreover, in the event of loss of either the SIM card, or the device containing the SIM card, the user must obtain a new SIM card in order to restore access to the associated account.

Thus, improved solutions are required for managing and accessing wireless services. Ideally, such solutions should not rely on a physical card for access control. Moreover, the improved solutions should be compatible with or support other desirable features such as, e.g., multiple access control profiles, backup of various profiles, remote storage of access control profiles, etc.

SUMMARY

The present invention addresses the foregoing needs by providing, inter alia, apparatus and methods for managing multiple access control entities for the provision of communication and/or data services to users.

In a first aspect of the invention, a method for providing a plurality of user access control clients to a plurality of user devices is disclosed. In one embodiment, the method includes: storing the plurality of user access control clients within a secure storage associated with a server; generating a plurality of database records for respective ones of the plurality of user access control clients; and receiving a request to access one of the individual ones of the plurality of user access control clients from a requesting device. If it is determined that the request may be serviced: then the requested access control client is retrieved from the secure storage, transmitted to the requesting device; and a database record is updated for the requested access control client to reflect use thereof at the requesting device.

In a second aspect of the invention, a method for providing access to one or a plurality of electronic subscriber identity modules (eSIMs) to a mobile device is disclosed. In one embodiment, the method includes: utilizing a plurality of database records for respective ones of the plurality of eSIM to generate a list of a subset of the plurality of eSIM accessible to the mobile device; receiving a request to access one of the subset of eSIM from the mobile device; and transmitting the requested eSIM to the requesting device; and updating a status identifier in a database record associated with the requested eSIM.

In a third aspect of the invention, a server apparatus for securely providing a plurality of access control clients is disclosed. In one embodiment, the apparatus includes: a plurality of interfaces; a storage apparatus configured to store a plurality of access control client thereon; a processor configured to run at least one computer program thereon. The computer program is configured to in one variant: generate a plurality of records, each of the records associated with an individual one of the plurality of access control client; receive a request to access one of the plurality of access control client from a requesting device; and determine, based at least in part on the current status of the requested one of the plurality of access control client and the requesting device, whether the request may be serviced.

In a fourth aspect of the invention, a user device capable of communication with a mobile device is disclosed. In one embodiment, the mobile device is for providing at least one of telephony and data services to a user thereof, and the user device includes: at least one interface; a storage apparatus; and a processor to run at least one computer program thereon. The computer program is configured to: compile information relating to a data structure usable on the mobile device; receive a request from the mobile device to access the data structure; transmit the requested data structure to the mobile device; and update the information relating to the data structure to indicate a current use thereof, the updated information comprising information indicating that the data structure is not available.

In a fifth aspect of the invention, a mobile device is disclosed. In one embodiment, the mobile device is configured to request, receive, and utilize a virtual or electronic SIM data structure.

In a sixth aspect of the invention, a computer readable apparatus is disclosed. In one embodiment, the apparatus includes a storage medium with at least one computer program running thereon, the at least one program being configured to receive, process, and provision requests for virtual or electronic SIMs.

In a seventh aspect of the invention, a system for distributing virtual or electronic SIMs to users is disclosed. In one embodiment, the system includes apparatus for delivery of the eSIMs over a network such as the Internet, or a MAN or WLAN.

Other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 8 illustrates an exemplary database of available eSIM with associated status indicators and authorized devices according to one embodiment of the invention.

DETAILED DESCRIPTION

Figure 1:
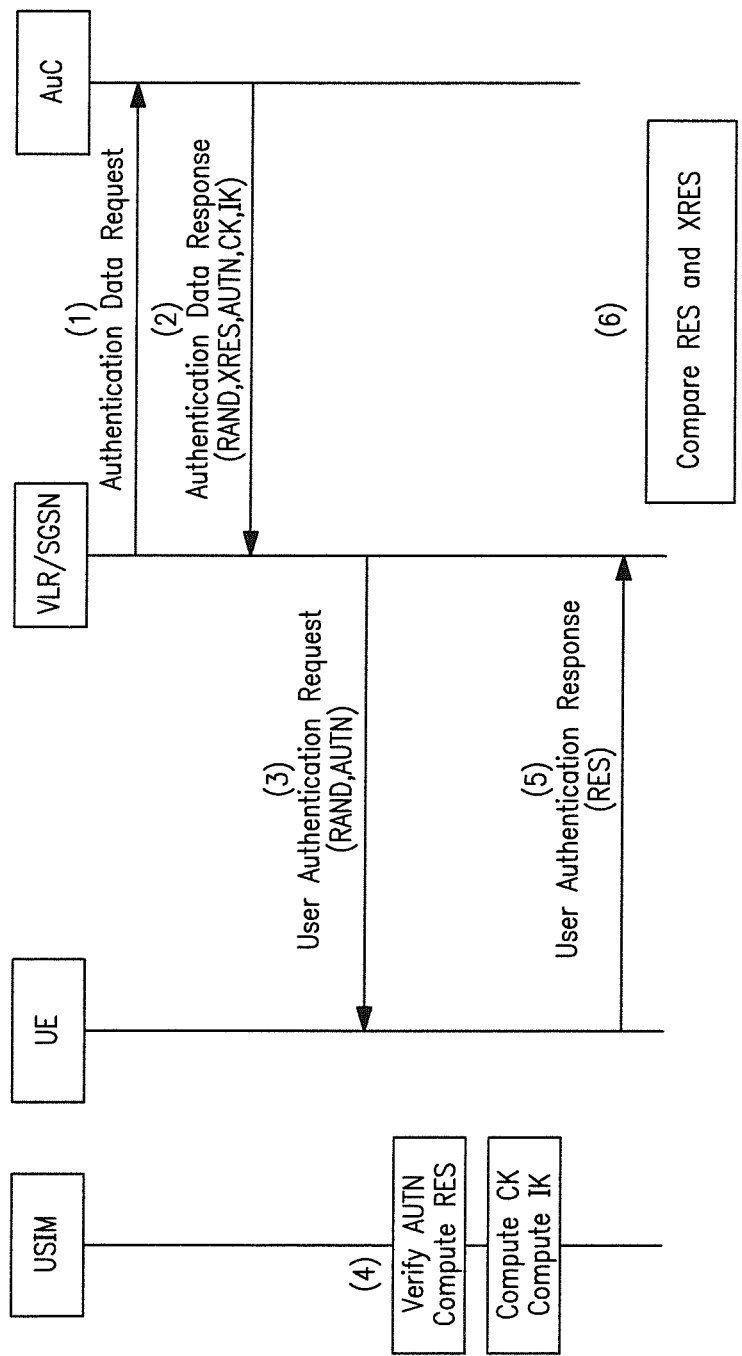
FIG. 1 illustrates an exemplary Authentication and Key Agreement (AKA) procedure using a prior art USIM.

Reference is now made to the drawings wherein like numerals refer to like parts throughout.

Overview

In one aspect, the present invention is directed to methods and apparatus that allow improved management of multiple access control entities or clients. In one exemplary embodiment, the invention allows the storing and switching between multiple virtual or electronic SIMs (eSIMs). As described in greater detail herein, eSIMs can be stored off-device for the purposes of backing up, transferring eSIMs between user equipment, or releasing unused eSIMs back to the SIM provisioning server (SPS).

In one exemplary implementation of the invention, eSIMs are stored on an external or remote computer, or other device (whether personal or third-party maintained), in an encrypted "wallet" form. For instance, in one use case, the user can restore eSIM operation from the "wallet" without involving a broker or carrier. In another embodiment, the eSIM may be "parked" on a cloud (network) infrastructure. An eSIM is parked when the user equipment containing the active eSIM releases it (discontinues further use of the eSIM), and stores the eSIM (or representation thereof) on a cloud element. The user may then later retrieve the eSIM from the cloud element to the same user equipment, or load it onto different user equipment. Additionally, a stored inactive eSIM on a cloud can also be released back to the carrier (regardless of being previously delivered or undelivered to the user equipment) for reuse.

As described in greater detail hereinafter, various aspects of the present invention relate to the association of an access control client with a user account. For example, a user can store and retrieve eSIMs from a cloud infrastructure. In some variants, parked eSIMs can be treated as fungible commodities, freely accessible to any device associated with the user account, etc.

DETAILED DESCRIPTION OF EXEMPLARY EMBODIMENTS

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from the provisioning and use of multiple access control entities or clients.

It will also be recognized that while the term "subscriber identity module" is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Prior Art Subscriber Identity Module (SIM) Operation

Within the context of prior art UMTS cellular networks, a user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services. The USIM software is based on the Java Card™ programming language. Java Card is a subset of the Java™ programming language that has been modified for embedded "card" devices (such as the aforementioned UICC).

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization the UICC can be distributed to subscribers.

Referring now to FIG. 1, one exemplary Authentication and Key Agreement (AKA) procedure 100 using the aforementioned prior art USIM is illustrated in detail. During normal authentication procedures, the UE 102 acquires the International Mobile Subscriber Identifier (IMSI) from the USIM 104. The UE passes it to the Serving Network (SN) 106 of the network operator or the visited core network. The SN forwards the authentication request to the AuC of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE 102 receives the RAND and AUTN, the USIM 104 verifies if the received AUTN is valid. If so, the UE uses the received RAND to compute its own response (RES) using the stored K and the same algorithm that generated the XRES. The UE passes the RES back to the SN. The SN 106 compares the XRES to the received RES and if they match, the SN authorizes the UE to use the operator's wireless network services.

Various aspects of the present invention are now discussed with respect to one exemplary implementation. In the context of the exemplary embodiment of the present invention, instead of using a physical UICC as in the prior art, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the UE. The eUICC is capable of storing and managing multiple SIM elements, referred hereafter as Electronic Subscriber Identity Modules (eSIM). Each eSIM is a software emulation of a typical USIM, and contains analogous programming and user data associated therewith. The eUICC selects an eSIM based upon the eSIM's ICC-ID. Once the eUICC selects the desired eSIM (s), the UE can initiate an authentication procedure to obtain wireless network services from the eSIM's corresponding network operator.

Two distinct methods for managing multiple eSIMs are described below. In one embodiment, the eSIM are stored (or "parked") at the network, such as at the SPS. Alternatively, the eSIM are stored at the client wallet. It will be appreciated, however, that the invention is in no way limited to these methods, the foregoing being merely exemplary of the broader principles.

Exemplary Client "Wallet" Operation

Figure 2:
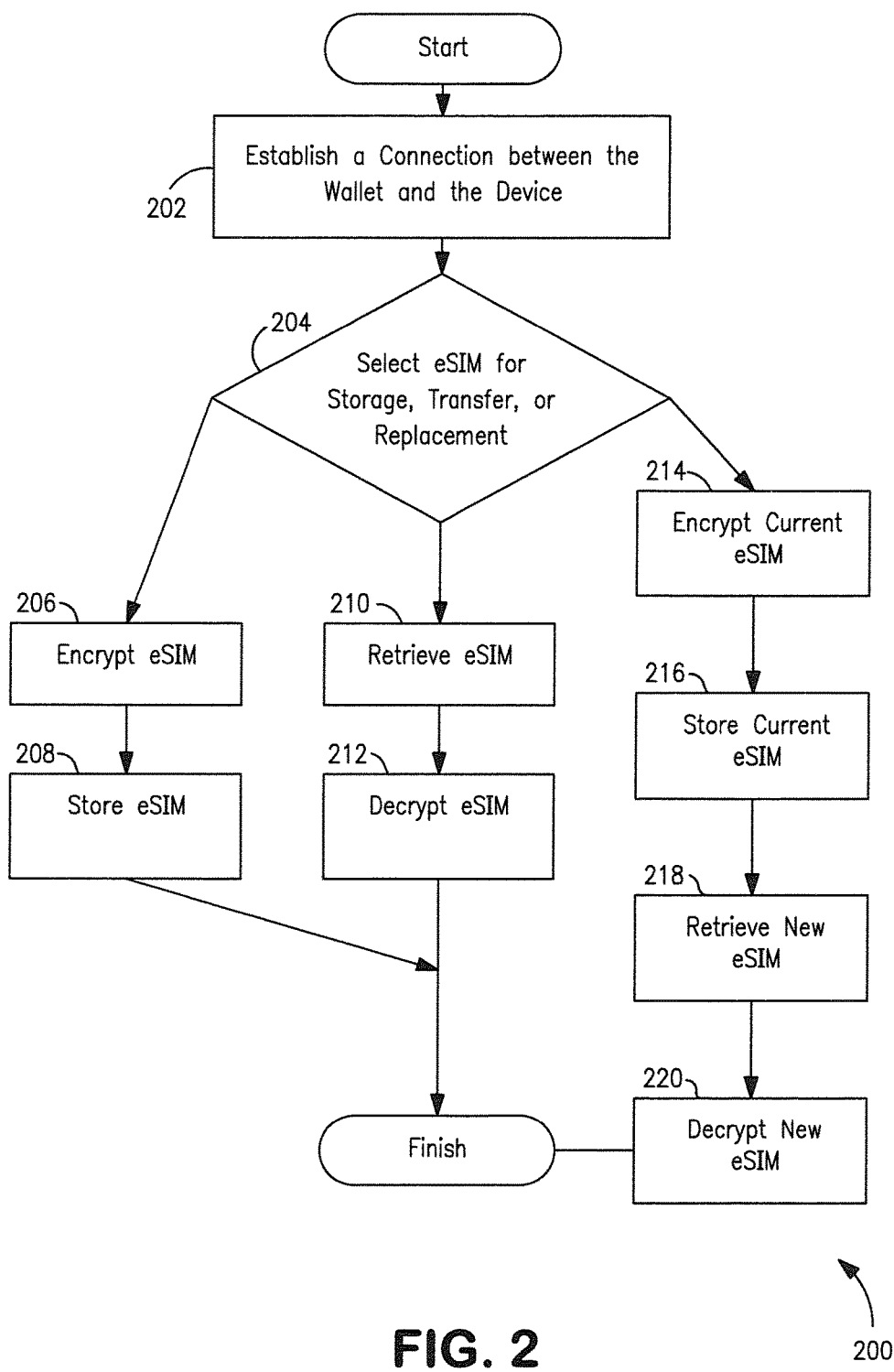
FIG. 2 illustrates one exemplary method for storing and retrieving an eSIM from a client wallet, according to the invention.

FIG. 2 illustrates one exemplary method for storing and retrieving an eSIM from a client wallet. As used hereinafter, the term "wallet" refers to a personal, handheld, or laptop computer or personal media device (e.g., iPod®) suitable for storing thereon one or more access control clients. For example, the wallet may comprise a software application running on a local computer (such as iTunes™ developed and distributed by the Assignee hereof); alternately, the wallet is disposed directly on the subscriber's mobile device. Moreover, the client wallet is within direct control of the subscriber, and can, at the subscriber's discretion, securely store, transfer, and/or replace an eSIM on a subscriber device.

At step 202, the mobile device establishes a connection to the wallet. For example, the user may connect their mobile device to a home or office computer. The mobile device identifies itself with a user account of the wallet. The user account may require a username, password, etc. It is appreciated that a wallet may comprise unsecured or possibly even compromised computer-readable media (discussed in greater detail hereinafter).

At step 204, the user selects one or more eSIMs for storage, transfer, or replacement. The user's user account is associated with one or more eSIMs. The user can select any of the eSIMs of the user account and request action (e.g., store, transfer, replace, add, delete, etc.) from a graphical user interface (GUI) within the software application. In some implementations, the listing of available eSIMs requires the additional step (not shown) of identifying the available eSIMs previously stored within the wallet (e.g., even eSIMs which were not previously associated with the user account), and eSIMs currently active or resident within the mobile device.

For example, if the user selects an eSIM for storage, then at step 206, the mobile device encrypts its eSIM. As previously alluded to, the wallet may comprise unsecured or compromised media. Consequently, step 206 provides a reasonable degree of security for the eSIM while stored in the wallet. Such security measures may include additional integrity checks, etc. At step 208, the wallet stores the encrypted eSIM. The wallet will also update its own status, to ensure that an eSIM is not accidentally (or maliciously), duplicated, lost, etc. Specifically, the wallet maintains an internal status of each eSIM's current status (e.g., active, inactive, etc.).

Similarly, if the user requests that an eSIM is transferred to the device for use, then at step 210, the mobile device downloads the requested eSIM. At step 212, the mobile device verifies that the eSIM has remained uncompromised by e.g., decrypting and verification of integrity checks. Pending successful verification, the eSIM can be loaded into the mobile device for use, and the wallet updates the eSIM's current status.

Exemplary Network "Parking" Operation

Furthermore, if the user requests a "swap" or replacement of an eSIM, the mobile device encrypts and stores its current eSIM (step 214, and step 216), and retrieves and decrypts the new eSIM (step 218, 220). Pending successful completion, both the previous eSIM, and the new eSIM status are updated accordingly.

Figure 3:
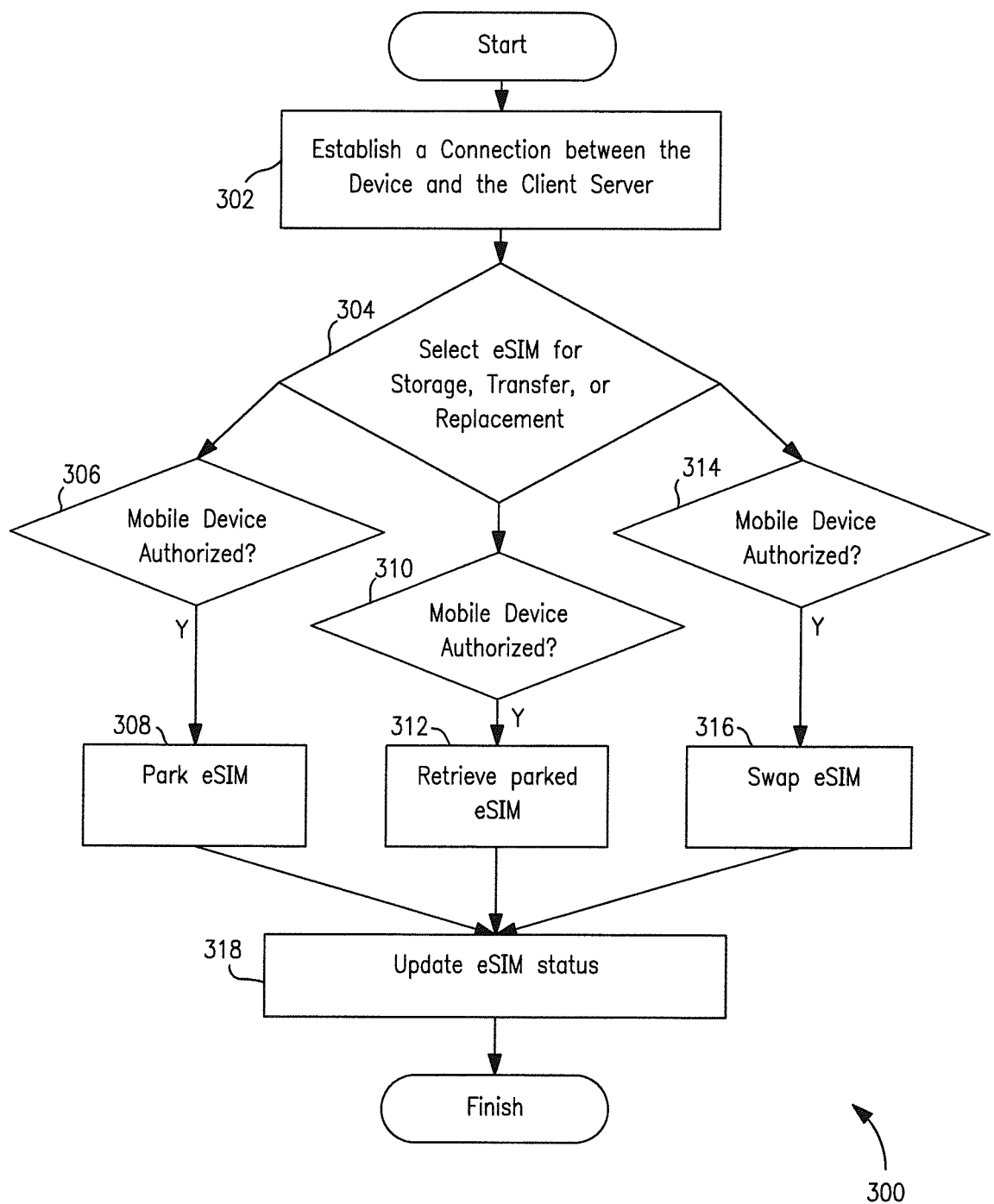
FIG. 3 illustrates one exemplary method for parking and retrieving an eSIM from a client server, according to the invention.

FIG. 3 illustrates one exemplary method for storing and retrieving an eSIM from a network appliance. As used hereinafter, the term "parking" refers to deactivating one or more access control clients for storage within a "client server"; as used herein, the term "client server" generally refers to a secure storage apparatus. The secure storage apparatus may be located within a network appliance, or other "cloud computing" structure. A parked eSIM is not within direct control of the subscriber i.e., the subscriber must activate the parked eSIM to renew operation.

At step 302, the mobile device establishes a connection to the client server. For example, the user may connect their mobile device to a home or office computer, where the computer has an application (such as iTunes Store™ developed and distributed by the Assignee hereof) that is connected to the client server. Alternatively, the user may directly access the client server via the mobile device (such as App Store™ developed and distributed by the Assignee hereof). The mobile device identifies itself with a user account of the client server e.g., based on a username, password, etc.

At step 304, the user selects one or more eSIMs for storage, transfer, or replacement. A user may select an eSIM for parking, or retrieve a parked eSIM. Once user has selected an eSIM and a desired action, the request is forwarded to the client server.

For example, if the user selects an eSIM for parking, then at step 306, the client server determines, whether the mobile device is authorized to park the eSIM. Authorization may be based on considerations such as: user identity, currently held eSIMs, currently parked eSIMs, suspected fraudulent behavior, suspected accidental behavior (e.g., accidental parking requests), etc. If the request is valid, then the client server parks the eSIM, and thereafter deactivates the eSIM (step 308).

Likewise, if the user wishes to retrieve a parked eSIM, then at step 310, the client server determines, based on the request, whether the mobile device is authorized to resume operation of the eSIM. If the request is valid, then the client server retrieves the eSIM, activates the eSIM, updates eSIM status, and transmits the eSIM to the mobile device (step 312).

Exemplary eSIM Management Network Architecture

Finally, if the user requests a "swap" or replacement of an eSIM, the network determines if the mobile device is authorized to issue the swap (step 314), and swaps the appropriate eSIMs by parking the current eSIM and deactivating the current eSIM, retrieving the new eSIM and activating the new eSIM, and finally loading the activated new eSIM to the mobile device (step 316).

Figure 4:
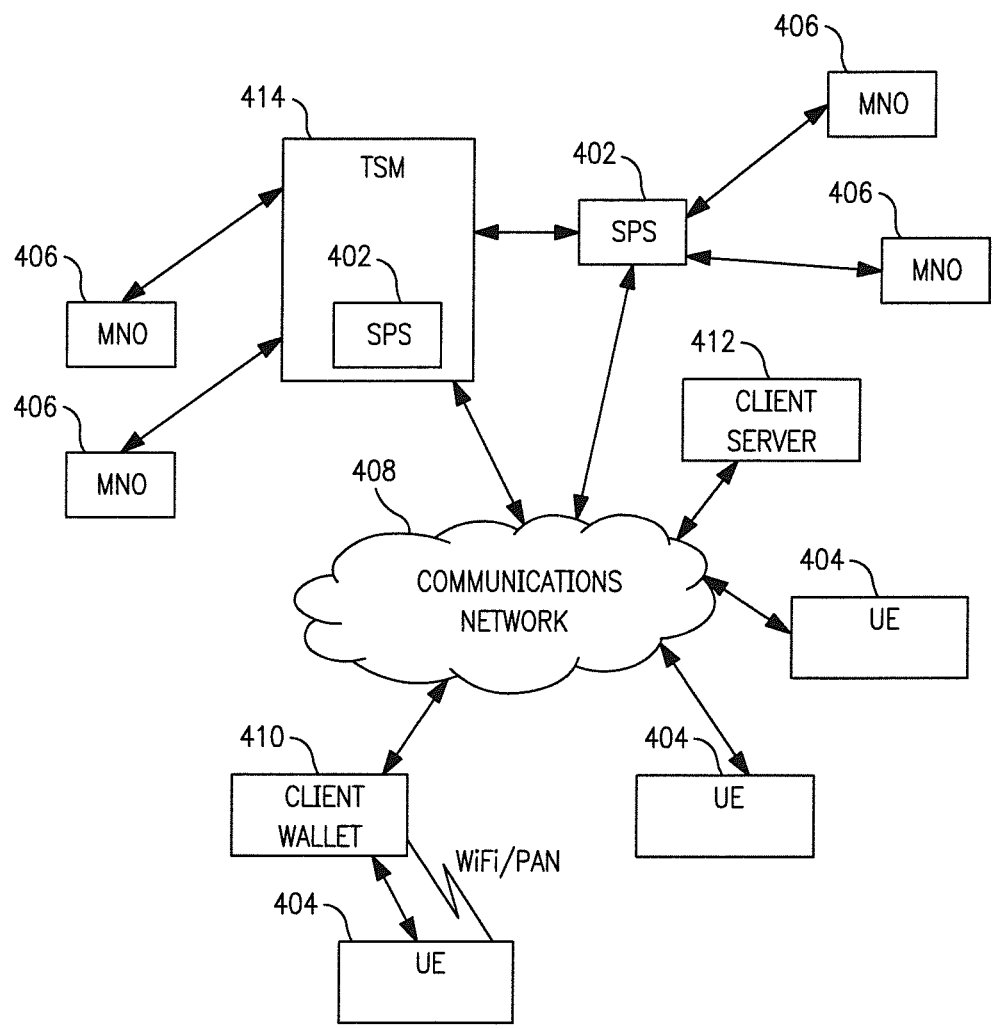
FIG. 4 illustrates one exemplary embodiment of an eSIM management network architecture according to the invention.

Referring now to FIG. 4, one exemplary electronic subscriber identity module (eSIM) management network architecture according to one embodiment of the present invention is illustrated. As shown, the network generally includes a SIM provisioning server (SPS) 402 configured to communicate with a plurality of user equipment (UE) 404 over a communications network 408. The SPS is further in communication with a plurality of mobile network operators (MNOs) 406. A brief description of the foregoing entities is now presented.

The SPS 402 in the embodiment of FIG. 4 is a stand-alone entity managed by a service intermediary. In one implementation, the service intermediary may comprise a device manufacturer (such as e.g., the Assignee hereof, Apple Inc.™) partnered to one or more MNOs 406, although other arrangements may be used with equal success. The SPS is responsible for storing a plurality of available eSIMs which are provided to and utilized by UE 404 in the network 408. The SPS may receive a "pool" of eSIMs from another entity (not shown), such as a third party entity, or alternatively, may generate the eSIMs itself. Each eSIM is pre-programmed or "personalized" based on the applicable network operator via the SPS.

As also shown, a SPS may also be embodied within a Trusted Service Manager (TSM) 414; common examples of TSMs include third-party SIM vendors, etc. The TSM has a pre-established trust relationship with one or more MNOs.

The MNOs 406 comprise wireless or mobile carriers and service providers. Exemplary MNOs typically provide telephony, short message service (SMS) text, and data services to a group of subscribers via a communications network. Examples of MNOs include e.g., AT &T™, Verizon™, Sprint™, etc.

The communications network 408 may be any network which enables the provision of the above-described services. For example, the communications network 208 may comprise a wired or wireless communications network. Common examples of a wireless network include cellular networks such as: Global System for Mobile Communications (GSM), General Packet Radio Service (GPRS), Enhanced Data rates for GSM Evolution (EDGE), Universal Mobile Telecommunications System (UMTS), or other network (e.g., CDMA2000, mobile WiMAX networks, WLAN networks, etc.). Common examples of a wired network include the Internet, etc.

Access to MNOs 406 may be provided via the combination of the standalone SPS 402 and/or TSMs 414 (and associated SPS). In other words, the standalone SPS may be utilized for providing services and eSIMs to UEs 404 on certain networks, while the TSM is utilized for providing services and eSIMs to UEs on other networks associated with the TSM.

Within the context of the exemplary electronic subscriber identity module (eSIM) management network architecture, the exemplary client wallet 410 and client server 412 are now described in greater detail.

As illustrated in FIG. 4, the client wallet 410 may be in communication with a plurality of UE 404 either via the communications network 408 or via a direct wired or wireless connection (as shown a WLAN/PAN). Accordingly, the wallet stores a plurality of eSIMs available to it and/or its associated devices (for example, either based on the user of the devices, a subscriber associated with the wallet and the devices, or the devices themselves). The wallet may distribute one or more of these eSIM to any UE in communication with the wallet.

Lastly, FIG. 4 illustrates a client server 412 which is accessible by the user over the communications network 408. Accordingly, the client server stores a plurality of eSIMs for distribution to one or more devices 404. The client server maintains a connection with the MNO, to support necessary authentication and accounting information.

The architecture of FIG. 4 may be used as discussed above to provide for the management of multiple eSIM for a particular subscriber, group of subscribers (e.g., family, enterprise, etc.), and/or device. The above-disclosed architecture may likewise be utilized to provide mechanisms for the UE 404 to switch eSIMs quickly and effectively, such as for managing different uses on different eSIMs (e.g., personal, business, travel, etc.). A user may simply, and without accessing the carrier directly, switch between several eSIMs.

A description of generalized methods and apparatus for implementing one or more aspects of the present invention is now presented.

Methodology

Figure 5:
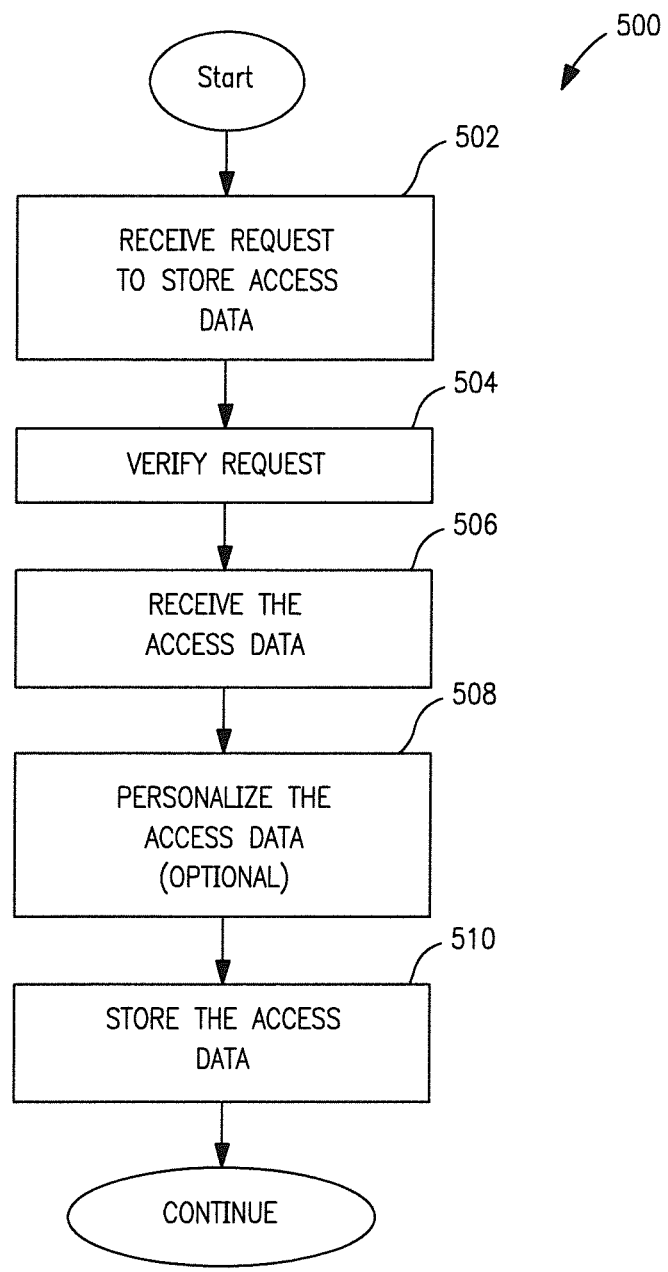
FIG. 5 illustrates one embodiment of a generalized method for initially storing an access control client in a network database, client wallet, or client server.

Referring now to FIG. 5, one embodiment of a generalized method 500 for initially storing an access control client in a network database, client wallet, or client server, is illustrated and described. The foregoing method ensures that the first time an access control client is stored, the access control client is not unnecessarily duplicated or lost, and that appropriate status is initialized. Thereafter, "sign-out" and "sign-in" procedures described in FIGS. 6 and 7 respectively can be used to maintain uniform access control client usage.

As shown, per step 502, a request to store an access control client is received. In one embodiment, the request is received from a user or a user device. Alternatively, the request may be received from a network entity such as an account management entity when an account is set up. For example, the user may purchase a device, then request via the device, the generation and provision of an access control client specific to that subscriber and device, for storage at a client wallet, or client server. In yet another embodiment, the request to store an access control client may be received from a first device, yet indicate that the control client be associated with a second device. In yet another embodiment, the request to store an access control client may be received from a first device indicating that the access control client is to be stored therein, and removed or deactivated from use.

The aforementioned storing of the access control client to a client wallet, or client server, may further include the transfer of dynamic data. Dynamic data relates to personalized data which is changed and/or created on the access control client after initial personalization. For example, where the eSIM is personalized to a specific network, subscriber and/or device, the personalized eSIM is then provided along with the dynamic data. As is true for the eSIM data, the dynamic data must remain secure during transit. The dynamic data and/or the eSIM itself can be physically secured if desired; e.g., via public/private key or AES/DES encryption, use of a cryptographic residue or hash for integrity protection, etc.

One common example of dynamic data is eUICC/eSIM state after over-the-air-service provisioning (OTASP). For example, in reference to the foregoing exemplary network of FIG. 4, a MNO 406 performs (OTASP) to add new types of services to a subscriber's device by using the communication network 408 instead of requiring the subscriber to physically bring the device in for reprogramming. After performing OTASP, the MNO 406 may track the eUICC state for the UE 404. The tracked state migrates as part of the dynamic data. Another common example of dynamic data is user created data (e.g., phonebook information, etc.).

Per step 504, the entity receiving the request (e.g., client wallet, client server, etc.) or other entity in communication therewith verifies the request. For example, the entity may determine the authenticity of the source of the request (i.e., ensure that the entity which sent the request is authorized to do so, and/or is on behalf of a device which is authentic), such as by authenticating the requesting device (or a subscriber associated with the device). If the requesting device/user is not authorized to make the request and/or not authenticated, the access control client will not be generated and/or stored.

For example, one exemplary authorization and authentication step determines that: (i) the requesting device is an authentic device, and (ii) the requesting device is allowed to store the access control client. For instance, verification of authenticity may require successful response to a known cryptographic challenge (e.g., key cryptography). If the device is successfully authenticated, then the device is checked for authorization (e.g., found within a list of authorized devices). If the device is successfully verified, then the process proceeds to step 506.

Alternately, in another exemplary embodiment, the verification may comprise a simple username and password. For instance, a username and password may be used to determine a user identity and access user account information. Similarly, in yet other exemplary embodiments, the verification may comprise a request, and a grant. For example, a first device may request an access control client from a second device, the second device verifies the request with a simple grant. Request grant schemes find particular use when migrating an access control client from a first device to a second device.

Alternately, in another exemplary embodiment, the verification may comprise verification with another entity. For example, a cellular device may request storage of an access control client, but the access control client may be (e.g., according to another trusted entity) invalid, already in use, compromised, etc.

Next, at step 506, the access control client is retrieved or received. As noted previously, the control client may comprise in one embodiment an eSIM. The eSIM may further include the aforementioned dynamic data. In one implementation, the access control client is in an encrypted or otherwise secure form. In one variant, the encryption cannot be decrypted by the receiving device. Such embodiments may be of particular use with client wallet type devices which may or may not be secure. For example, the eSIM may be encrypted with a key known only to the user device. Thereafter, even if the wallet is compromised, the eSIM cannot be decrypted. In other variants, the encryption can be decrypted by the receiving device. Such embodiments may find use in client server embodiments, which may decrypt the access control client to retrieve various user information therefrom e.g., dynamic data associated with an eSIM. For example, in the event a user parks a first eSIM and retrieves a second eSIM, the user may wish to retrieve dynamic data contents, such as a phonebook of contact information, etc.

At step 508, the access control client is optionally "personalized" for the appropriate network. As discussed above, in one embodiment, the access control client is personalized or pre-programmed with information that is specific to a particular network operator, service provider, or MNO. Alternately, personalization may occur at another entity. Step 508 may further include encryption or other form of securing the access control client.

Personalization of the data (step 508) may also include associating a status indicator to the access control client and/or creating database records corresponding to each access control client. The records may be used to illustrate the current status of the access control client (via the status indicator), as well as other information to identify a subscriber associated with the data, and one or more devices authorized to make use of the data.

For example, in one exemplary embodiment, an internal database initializes a status indicator for the access control client (see FIG. 8, and associated discussion discussed infra). The status indicator indicates whether the access control client is currently in use (e.g., "in use"), currently unable to be used (e.g., "held"), available for immediate use (e.g., "available"), and not available for use (e.g., "unavailable").

Per step 510 of the method 500, the access control client is stored. In one embodiment, the access control client (e.g., eSIM and associated dynamic data) are stored in a database at the client wallet, client server, or other entity in communication with one of the foregoing. Additionally, internal status of the access control client is updated to reflect current storage.

Figure 6:
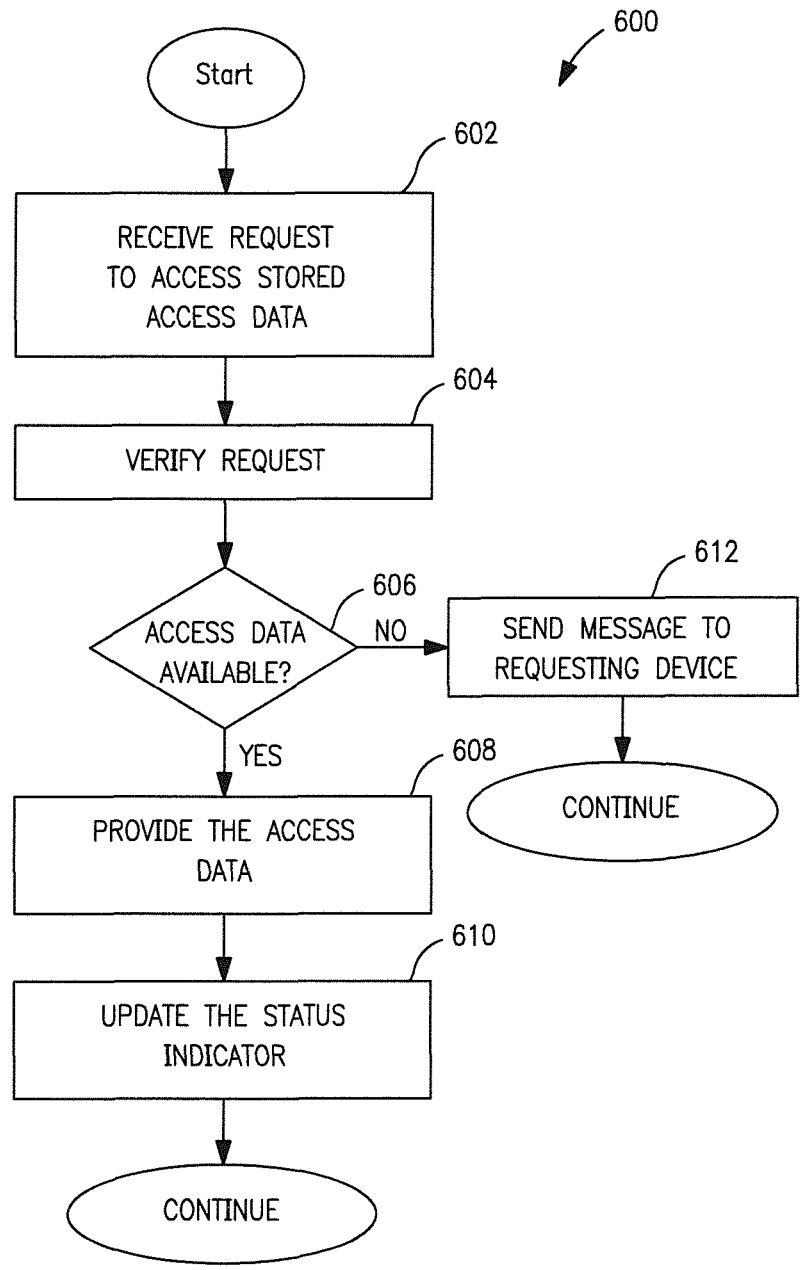
FIG. 6 illustrates an exemplary method for making an access control client available to user devices.

Referring now to FIG. 6, an exemplary method 600 for making an access control client available to user devices ("signing out") is illustrated.

As shown, per step 602, a request is received for one or more access stored access control clients. For example, a client server receives a request for one or more access control clients from a user device. In another example, a client wallet receives a request from a user or mobile device requesting the access control client therefrom.

In one exemplary embodiment, the request is generated when a user of a UE selects a particular one of available eSIM data from a list of available eSIM offered by a wallet or client server, via a user interface of the user's device. For example, the wallet device generates a list or directory of eSIMs which are available to the mobile device, and the user responsively selects one.

It will also be appreciated that while step 602 described above utilizes a "request/response" model, the method 600 may also be configured to operate using a "push" model, whereby a network device (such as e.g., the SPS, or TSM) initiates a transfer of an eSIM and/or the list of available eSIM without receiving a request. This might occur where it is detected that a user device is without an active eSIM for a predetermined length of time, and/or upon account set-up, or under yet other circumstances or schemes (e.g., polling of client devices at a prescribed periodicity or in an event-driven manner).

Next, at step 604, the entity receiving the request (e.g., the client wallet, client server) verifies the request. If the requesting device/user is not authorized to make the request and/or not authenticated, the access control client data will not be granted.

At step 606, once the requesting entity is verified, the status indicator of the requested access control client is reviewed, and it is determined whether the access control client is available. The availability of the access control client for use by the particular requesting device and/or user is determined by querying a database of available access control clients. For example, the wallet and/or the client server or other entity in communication (e.g., SPS, TSM, etc.) verifies that the eSIM is available for operation.

For example, an internal status database (e.g., the wallet) gives a status indicator for each eSIM (see FIG. 8, and associated discussion discussed infra). The status indicator indicates whether the requested eSIM is currently in use (e.g., "in use"), currently unable to be used (e.g., "held"), available for immediate use (e.g., "available"), and not available for use (e.g., "unavailable"). If, at step 606, it is determined that the requested access control client is available, the control client is sent to the requesting entity (step 608). It is appreciated that, as noted above, one or more mechanisms for ensuring the security of the transmissions may be utilized. It is further appreciated that dynamic data may be provided alongside the requested access control client.

If it is determined that the access control client is available and is provided to the requesting device, the status of the access control client is updated in the database to reflect this new use (step 610). As discussed above, when eSIM and associated dynamic data is stored, the record is associated with a status indicator associated therewith. These are stored in a database in communication with the entity for providing the access control client (such as the client server or wallet). The indicator is updated to illustrate a new use (or a stopped use) of the eSIM data.

If, at step 606, it is determined that the requested access control client is not available (either because it is "in use", "held" or "unavailable"), per step 612, a message is provided to the requesting device. The message may indicate that the requested access control client is not available, and may also give a reason for the unavailability (such as that the eSIM is not available while the device is roaming, that the eSIM is not available while another eSIM is in use on that same device, etc.).

In one embodiment, the original eSIM data is maintained at the client server or wallet, while a copy thereof is provided to the requesting entity (as opposed to removing the eSIM after transmittal). As will be discussed elsewhere herein, this embodiment is particularly useful for providing eSIM backup. The database is updated to reflect that the control client is in use and cannot be sent again (although it persists in storage). In this manner, the same eSIM is prevented from being provided to more than one device at any one time. However, it is appreciated that a given eSIM may be marked for delivery and simultaneous use on more than one device if so desired, such functionality being demonstrated by the status indicator of the eSIM in the database.

In many instances, the eSIM data must be re-instated at the providing entity (e.g., client server or wallet) in order for it to be made available for subsequent use on another device. However, it is appreciated that a single eSIM may be used on multiple devices as well. The ability of a particular eSIM to be used on one or more than one device at a time is illustrated in the status indicator discussed hereinafter.

Furthermore, the methods and apparatus described supra allow a user or network operator to restore eSIMs to a device in the instance of a lost or malfunctioning eSIM. For example, the user can restore a failed or corrupted eSIM profile by restoring the device from a previously stored backup at the wallet. In this manner, backup and restoration may advantageously be performed without the assistance of a broker or carrier. Backup from a client server may also be performed, however, the client server may require additional verification information, and/or authorization by a broker, or carrier entity.

Figure 7:
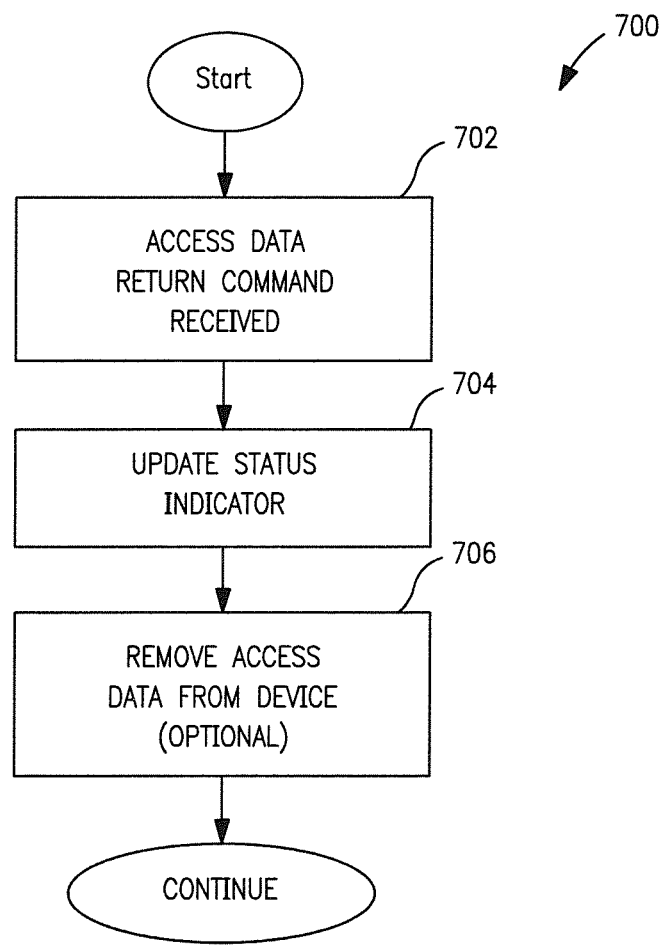
FIG. 7 illustrates and exemplary method for returning a control client from a user device.

As discussed above, when the access control client is requested by or provided to a device, a physical copy of the data is, in one embodiment, kept at the providing device (e.g., client server or wallet), and the device is provided with a copy of the data (including e.g., an eSIM and dynamic data). As also noted above, subsequent use of the copy resident at the providing device is subject to a status indicated in the database. For example, an "unavailable" status indicates that the second copy is in use elsewhere, and that the resident copy is not available for use on additional devices. According to this embodiment, a method for making the control client available once again at the client server or wallet device either for use thereon, or for subsequent transfer to another device (e.g., UE) as illustrated in FIG. 7 is needed. Note that an eSIM may also be returned to the providing entity via the method of FIG. 7 if the eSIM is unnecessary and/or not used by the device.

Referring now to the method of FIG. 7, returning a control client (or "signing in") may be performed prior to or simultaneously with a user selection to clear the access control client from the device. In other words, when the user of the device deletes an eSIM from their device (such as in order to use a different eSIM thereon), the eSIM will not be removed unless the method of FIG. 7 is performed. Alternatively, an eSIM may be explicitly removed upon receipt of an explicit command, such as from a SPS, TSM or other network entity.

As shown, per step 702 of the method, a command to return the access control client is received. The command may be generated automatically after a predetermined period, or according to another scheme. For example, a particular eSIM may have an expiration time/date upon which it must be returned. Alternatively, the return command may be generated when a user instantiates a function for returning the selected eSIM.

In the client wallet embodiment, the return command of step 702 may be wirelessly sent from the UE to the wallet or server. Alternatively, the return command may be instantiated (either manually or automatically) upon wired connection of the devices to one another, such as during docking (e.g., via USB, IEEE-1394, etc.), or other connection.

In another embodiment, the return process may be instantiated in response to a signal received from either the wallet, the SPS, and/or other network entity. For example, a request for a particular eSIM may be received at the wallet, client server, SPS, TSM or other trusted network entity, originating from a user. In response to the request, if it is determined that the requested eSIM is currently unavailable (as being disposed on or in use by another device), the wallet, client server, etc. generates a message which is transmitted to the device currently using the requested eSIM (such as via wireless transmission mechanisms). The message indicates that another user or device is requesting access to the control client, and may either automatically begin the return process discussed herein (FIG. 7), or enable the user of the device to select to begin the return process or deny access.

Next, the method proceeds to step 704, where the marker (status indicator) is updated to reflect that the access control client is now available or is no longer in use. It is appreciated that in one embodiment, prior to updating the status indicator, the wallet, client server, SPS, TSM, network entity, etc. first determines whether the particular access control client for which the return process requested is shown in the database as not being currently in use. Generally, any inconsistency in state may signify that the previous use of the control client may have potentially been illegal, surreptitious, or otherwise does not comply with use/reproduction rules for the control client. Accordingly, in some embodiments, state errors are reported to a network administrator or other cognizant entity.

Finally, at step 706, the access control client is removed from storage at the device. Such removal may comprise (i) a complete removal or erasing, or alternatively (ii) disabling the control client so that it is inaccessible and/or uncopyable, and leaving the disabled copy on the client for possible later re-activation, or (iii) encryption with access only permitted by an authorized entity having the correct decryption key.

While the return process discussed herein includes deleting the version of the access control client stored at the UE and restoring the status of an original version of the access control client stored at the client server or wallet, it is appreciated that in another embodiment, the original control client may be copied back between these entities, the resident copy being merely disabled.

In another aspect of the invention, additional computer programs disposed on e.g., the SPS, the client server, the UE, the wallet, or other location are utilized to invoke operational rules thereon. The operational rules are used to achieve one or more goals relating to operations or business (e.g., profit) including e.g., network optimization and reliability goals, increased maintenance intervals, increased subscriber or user satisfaction, increased subscription base, higher profit, and so forth.

For example, in one embodiment of the present invention, various logical rules for competing uses or requests for access control clients may be implemented. For instance, a "first come first served" paradigm can be employed, where a first user (e.g., the first UE in the example above) is given priority and the right to deny the second or subsequent requests. Alternatively, a user or device profile can be used as the basis of establishing a priority; e.g., the second (requesting) user in the example above may comprise a user with a higher privilege, in which case the content is checked out from the first device and provided to the second client. As yet another alternative, the return process may be delayed, so as to permit the completion of an in-progress service before the return is performed, so as to not interfere with the user's experience when using the access control client. As yet another model, a "round robin" or other sharing scheme can be employed so as to balance allocation over time or number of requests.

In another such example, one or more software routines adapted to control access to or distribution of eSIM, dynamic data, or other access control client as discussed herein (and in some cases the operation of e.g., the client server, SPS, wallet, and/or the UE) are employed. The rules may comprise a separate entity or process, or may be fully integrated within other processing entities (e.g., the SIM provisioning application, eSIM wallet application, and/or the client eSIM management application).

It is appreciated that the distribution and use of access control clients (e.g., eSIM) may occur according to certain operational protocols or decision processes (as discussed above), actual or projected conditions existing within the network, etc. For example, in the embodiments discussed above, a particular eSIM will be provided to a requesting device provided the eSIM is available (in some cases not already in use on another device) and the device is authorized to use the eSIM. However, this decision processes may not always be consistent with higher-level business or operational goals, such as reducing latency, or maximizing profit or system reliability. Hence, when imposed, the business/operational rules can be used to dynamically (or manually) control the distribution and/or use of access control client across multiple devices.

One rule implemented may comprise enabling the transfer and/or use of an eSIM to a particular UE according to a subscriber class. In other words, a first class of subscriber may only be permitted to receive certain ones of available eSIM, and/or a wallet associated with a first class of subscriber may only be permitted to transmit eSIM to a limited number of additional devices. A higher class of subscriber however may be entitle to receive all eSIM or upgraded eSIM (discussed below) and/or a wallet associated with a higher class subscriber may be able to transfer eSIM to an unlimited number and type of devices.

Similarly, the transmission of a requested eSIM may be controlled to only subscribers and/or devices meeting certain criteria. For example, if the requesting device does not possess requisite functionality to use an upgraded eSIM, it may be denied access to the upgraded eSIM. Alternative, eSIM meeting the device or subscriber limitations may be provided at the denial of access as well.

In yet another embodiment, a rule in which certain eSIM are given an expiration date/time may be implemented. That is to say, a limit may be set as to how long a given eSIM may be resident at a particular device, and/or a schedule may be pre-established for having a certain eSIM during certain time periods (and a different eSIM at others). Once the time limit or scheduled time expires, the eSIM may be automatically deleted from the device, and the eSIM return process (see FIG. 7) initiated.

In a still further embodiment, an upgraded or "smart" eSIM may be provided. The smart eSIM are capable of adjusting the services provided to the user(s) based on the type of device and/or subscription level of a subscriber using the eSIM. For example, the smart eSIM may cause certain functions or services to be enabled/disabled when the eSIM is moved from e.g., a smartphone to a so-called "feature phone" and even more functions disabled when transferred to a so-called "dumb phone".

Business rules may also be implemented, such as for generating revenue for an eSIM distributor. In particular, as noted above, the stand-alone client server may be managed by a service intermediary; this service intermediary may comprise a device manufacturer partnered to one or more MNOs, yet commanding a premium for access to the eSIM distributed from the SPS. Pricing structures may be derived on e.g., a per eSIM basis, such as where each subscriber must pay a premium for each eSIM it is given access to. It is appreciated that more advanced eSIM, such as those which are able to be used on more than one device, those that maybe be used simultaneously on more than one device, and/or smart eSIM may be offered at a higher premium than other eSIM. It is further appreciated that certain features discussed herein, such as the wallet UE feature, may be structured to require advanced or upgraded subscriptions.

Additionally, rules may be implemented for splitting or combining a subscriber bill based on eSIM. In other words, a subscriber may elect to receive a single bill for usage across all eSIM on all devices. Alternatively, the subscriber may elect to receive multiple bills, each bill representative of use for a single eSIM associated to the subscriber regardless of the device on which the eSIM was used.

Still further, it is appreciated that the client server may be managed by the aforementioned service intermediary (such as a device manufacturer) and provide mechanisms and business rules eSIM access. In one embodiment, a user may purchase UE, then via the Internet or other communication network, request post- or pre-paid access to eSIM. The service intermediary performs many of the functions of an MNO (such as by managing billing, etc.) according to this embodiment.

eSIM Database

Referring now to FIG. 8, an exemplary database of available eSIM with associated status indicators and authorized devices is shown. As illustrated, more than one eSIM may be associated to a single subscriber. For example, [eSIM 1], [eSIM 2] and [eSIM 3] are each associated to Subscriber 1. As shown [eSIM 1] is currently in use on Device A, while [eSIM 2] and [eSIM 3] are in a "held" status. The "held" status indicates that [eSIM 2] and [eSIM 3] are alternate eSIM which may be used by Device A, though not simultaneously with the use of another eSIM.

FIG. 8 further illustrates that a single subscriber may be associated to more than one device, each device having one or more eSIM. For example, [eSIM 4] and [eSIM 5] are both associated with Subscriber 2. However, [eSIM 4] is authorized only for Device B and [eSIM 5] is authorized only for Device C. The status of [eSIM 5] in FIG. 8 is currently "not available". This status indicates that it is not desirable or possible to use the particular eSIM at this time. This may occur for example, when the device is roaming, and the particular eSIM is not able to be used during roaming.

As is also illustrated at FIG. 8, a single device may accommodate and use more than one eSIM at a time. For example, the database indicates that [eSIM 6] and [eSIM 7] are both available for use on Device D (operated by Subscriber 3). FIG. 8 also illustrates that a single eSIM may be in use on multiple devices at once (i.e., [eSIM 6] is currently "in use" on both Device D and E).

Client Server

Figure 9:
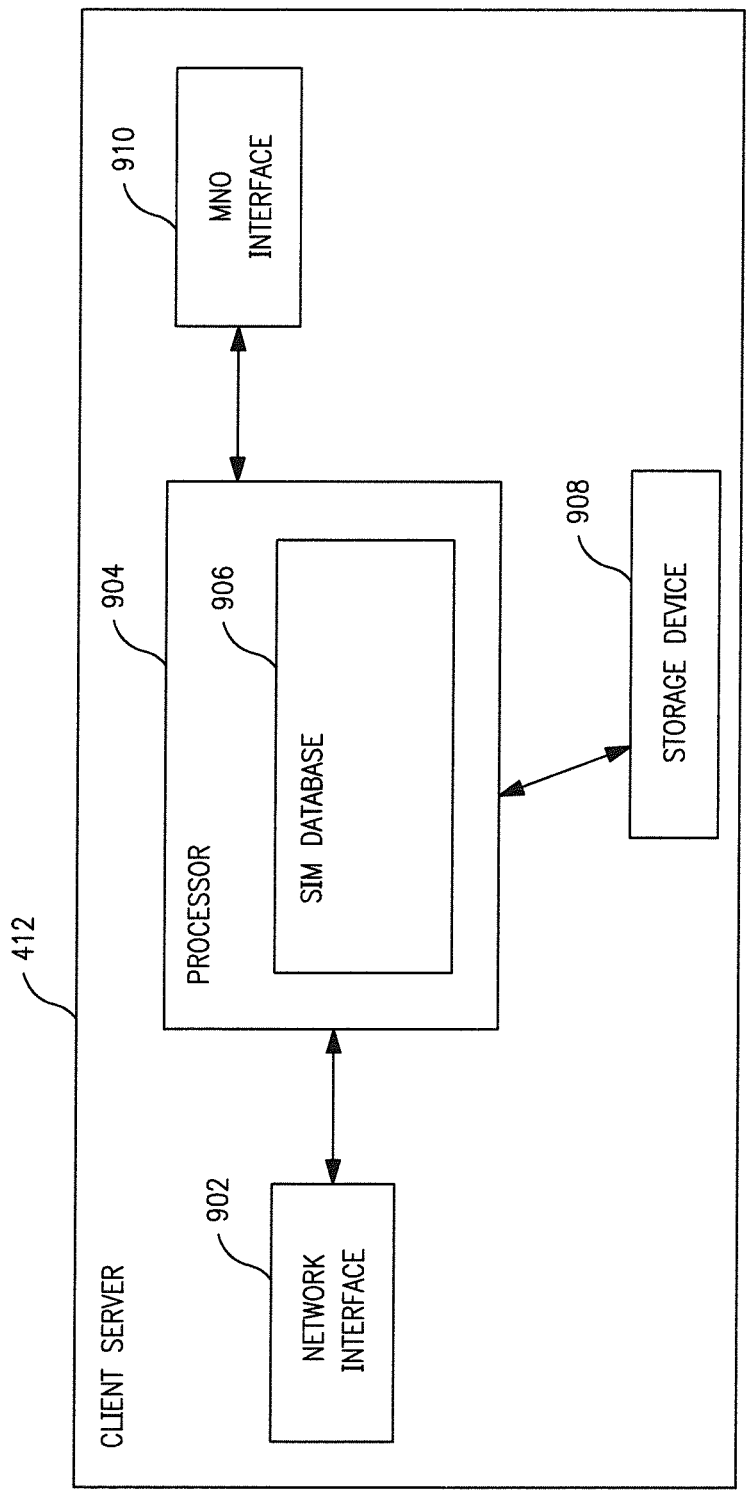
FIG. 9 illustrates one exemplary embodiment of an SPS useful with the present invention.

FIG. 9 illustrates one exemplary embodiment of a client server 412 useful with the present invention. As discussed above, the client server may comprise a stand-alone entity, or incorporated with other network entities (e.g., a SPS, a TSM, etc.) As shown, the client server 412 generally includes a network interface 902 for interfacing with the communications network 408, a processor 904, a storage apparatus 908, and various back end interfaces. Although an MNO interface 910 is illustrated, it is appreciated that this interface may be omitted, replaced, or duplicated. Other interfaces may also be utilized, the foregoing being merely illustrative. The MNO interface 910 enables the client server 412 to communicate with one or more MNO 406.

In the illustrated embodiment, the client server 412 includes at least a SIM database 906 running on the processor thereof. Although illustrated as a single application running on the client server, it is appreciated that the foregoing database functionality may comprise a distributed application running on a plurality of entities in data communication with one another.

The database application receives communications from the UE 404 such as (i) a communication requesting that a particular eSIM be stored thereon, (ii) a communication requesting access to one or more eSIM stored thereon, and/or (iii) a communication requesting return of an eSIM which was previously transmitted to a particular UE 404. The database application is also responsible for verifying the above requests to ensure these are received from authorized entities and there are no security concerns.

The database application is configured to store a database of available eSIMs. As illustrated in FIG. 8, the database may provide information relating to the subscriber associated with a particular eSIM, the devices authorized to use the eSIM, and the current status of the eSIM. Additional information may be maintained as well. Likewise, the database application is configured to update or change information stored in the database. For example, the application may be used to update the current status information to reflect that a particular eSIM is "available", "in use", "not available", etc. Changes to authorized subscribers, authorized devices, etc. may also be made in the database by the database application.

When a user or device requests an eSIM from the client server 412, database application is responsible for determining the current status of the requested eSIM as well as whether the requested eSIM may be provided. The determination of whether an eSIM is available and may be provided may be specific to the requesting subscriber or device, and/or to the requested eSIM. For example, the database application may be configured to query network entities (such as billing entities, etc.) to determine a service level or tier for a requesting user or device. This information may then be utilized to determine whether the requesting user or device may access the requested eSIM. Alternatively, the database application may simply receive rules for each eSIM from a separate entity (such as the entity which generates the eSIM, or another network entity charged with making the aforementioned determinations either in response to a query or automatically.

Still further, the database application may be used to generate a list of available eSIM specific to each device in communication therewith. In one embodiment, this may be simply accomplished by running a query of the database of available eSIM for a particular subscriber, device, etc. and providing the results of this query in the form of a selectable list to a requesting device.

Lastly, the database application may optionally generate notifications to a system administrator in the inst2nce that it is believed that an illegal or unauthorized copy of an eSIM has been created and/or distributed.

User Equipment (UE)

Figure 10:
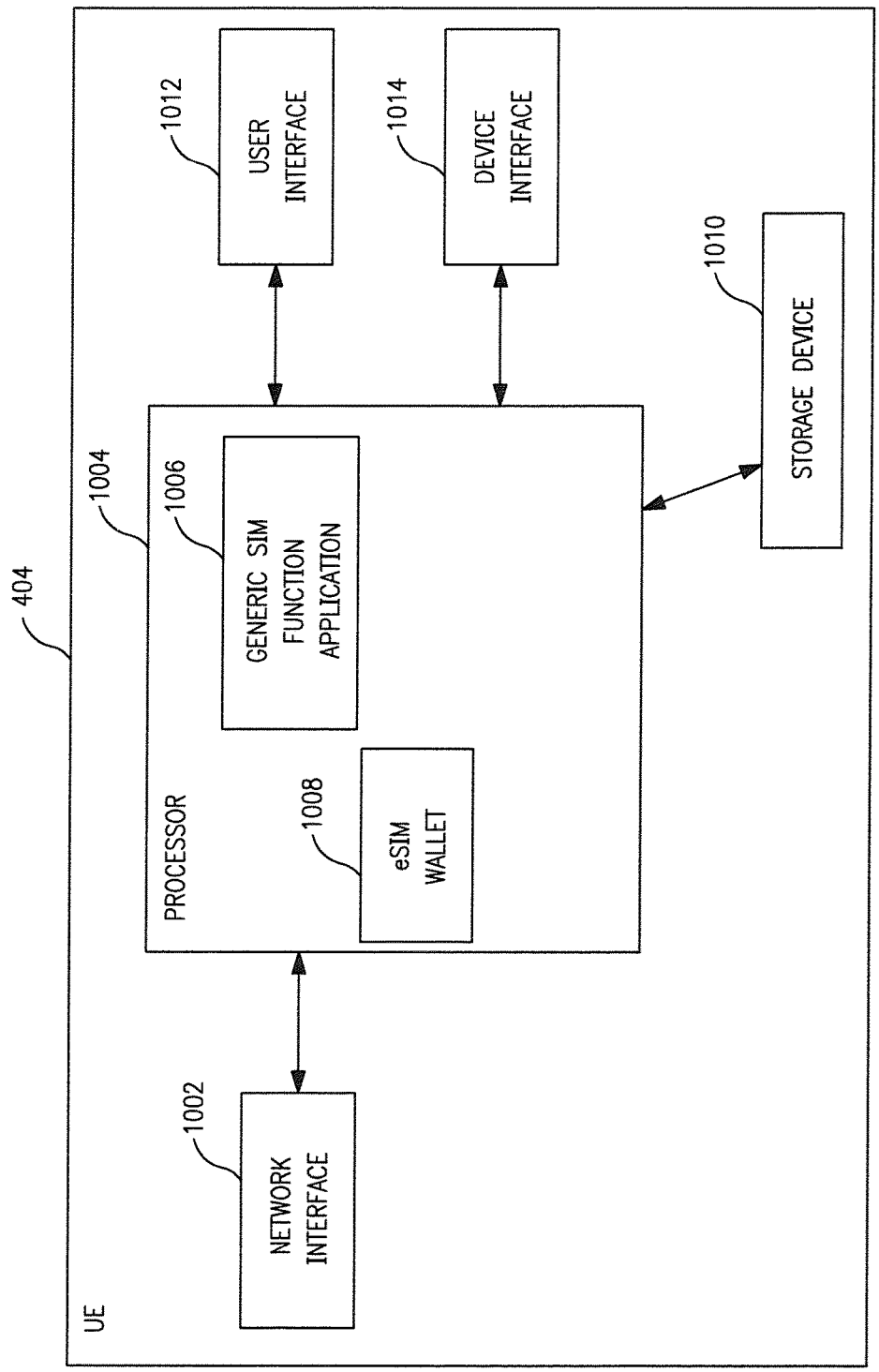
FIG. 10 is a block diagram illustrating an exemplary user device for use in the multiple eSIM management features of the invention.

FIG. 10 is a block diagram illustrating an exemplary user device 404 for use in the multiple eSIM management features discussed herein. As discussed above, the UE 404 may, in some embodiments, comprise an internal wallet device.

As illustrated, the exemplary UE 404 of FIG. 10 includes a network interface 1002 for communication with the communication network 408 (and entities thereof including the client server). The UE 404 may also communicate with the client server via the network interface 1002. In one embodiment, the UE requests and receives eSIMs via this interface. The UE further includes a digital processor 1004 and associated storage 1010, the digital processor is configured to run various applications thereon. A plurality of back-end interfaces are also illustrated. Although a user interface 1012 and a device interface 1014 are illustrated, it is appreciated either or both of these may be omitted, replaced, or duplicated. Alternative interfaces may also be utilized. The user interface enables the UE to communicate with a user of the device, for example to display messages and provide services to the user. In one embodiment, the optional device interface includes a wired or wireless interface that enables the device to communicate another device e.g., a wallet or client server.

The processor 1004 is configured to run one or more of: (i) a generic SIM function application 1006, (ii) and an eSIM wallet application 1008 thereon.

The generic SIM function application 1006 is, in one embodiment, responsible for receiving and directing the UE to store a plurality of "generic" SIM or other data provided from a network entity. The generic SIM function application may be utilized to (i) request a generic access control client, (ii) receive a generic access control client, (iii) direct the storage of the generic access control client, and/or (iv) direct the use of certain ones of the generic access control client.

In the instance the device includes a wallet device 410, an eSIM wallet application 1008 may be utilized to receive, store, and provide access control client (eSIM) to a plurality of UE 404. The wallet application 1008 may be used to generate a database of available eSIM which, may include information relating to the authorized devices and current status of each eSIM.

The wallet application 1008 may further receive requests for access to individual ones of the eSIM from various UE 404. The wallet application is used to determine whether a request for particular eSIM data may be serviced based at least in part on the requesting device, a user associated with the requesting device, and information contained in or associated with the particular eSIM. The wallet application 1008 may do this by, e.g., querying the storage entity on which the content his held, for the status of the requested content.

If an eSIM is provided, the wallet application 1008 updates the status indicator associated with the data in a database at the UE 404. Alternatively, the wallet or eSIM applications may send a message to update the status of the eSIM at an external entity such as a client server 412, etc.

The storage device 1010 of the UE 404 may be configured to store a plurality of available access control client thereon, including the above referenced dynamic data. The storage device 1010 may further store the above-described computer applications which are run on the processor 1004. The storage device 1010 may comprise for example a random access memory (RAM), a hard disk drive, an optical drive (e.g., CD-ROM or DVD), NAND/NOR flash memory, or some combination thereof.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for transferring electronic Subscriber Identity Modules (eSIMs) between mobile devices, the method comprising, at a server device configured to manage a plurality of eSIMs:

identifying a condition to provide an eSIM included in the plurality of eSIMs to a first mobile device;

referencing a usage status associated with the eSIM to identify whether the eSIM is being utilized by a second mobile device;

determining, in accordance with the usage status, that the eSIM is being utilized by the second mobile device, wherein the eSIM enables the second mobile device to access a second subset of wireless services selected from a set of wireless services associated with the eSIM;

prompting the second mobile device to return the eSIM to the server device; and in response to receiving the eSIM from the second mobile device:

providing the eSIM to the first mobile device, wherein the eSIM enables the first mobile device to access a first subset of wireless services that is selected from the set wireless services and is distinct from the second subset of wireless services, updating the usage status to reflect providing the eSIM to the first mobile device, and causing the eSIM to be deleted from the second mobile device.

2. The method of claim 1, wherein the condition comprises (1) receiving, from the first mobile device, a request to download the eSIM, or (2) detecting that the first mobile device is without an active eSIM for a threshold amount of time, and the method further comprises:

denying the request when the second mobile device does not return the eSIM to the server device.

3. The method of claim 1, wherein the usage status associated with the eSIM is stored in a database that is accessible to the server device, and the usage status indicates whether the eSIM is active or inactive.

4. The method of claim 3, wherein, when the eSIM is inactive, the eSIM is stored at the server device.

5. The method of claim 3, wherein, when the eSIM is active, the usage status further indicates a particular mobile device on which the eSIM is active.

6. The method of claim 5, wherein updating the database to reflect the usage status of the eSIM comprises:
updating a value of the usage status to indicate that the eSIM is active on the second mobile device.

7. The method of claim 1, wherein:
the first subset of wireless services corresponds to capabilities possessed by the first mobile device, and
the second subset of wireless services corresponds to capabilities possessed by the second mobile device.

8. A non-transitory computer readable storage medium configured to store instructions that, when executed by at least one processor included in a server device, cause the server device to transfer electronic Subscriber Identity Modules (eSIMs) between mobile devices, by carrying out steps that include:
identifying a condition to provide, to a first mobile device, an eSIM included in a plurality of eSIMs managed by the server device;
referencing a usage status associated with the eSIM to identify whether the eSIM is being utilized by a second mobile device;
determining, in accordance with the usage status, that the eSIM is being utilized by the second mobile device, wherein the eSIM enables the second mobile device to access a second subset of wireless services selected from a set of wireless services associated with the eSIM;
prompting the second mobile device to return the eSIM to the server device; and
in response to receiving the eSIM from the second mobile device:
providing the eSIM to the first mobile device, wherein the eSIM enables the first mobile device to access a first subset of wireless services that is selected from the set wireless services and is distinct from the second subset of wireless services,
updating the usage status to reflect providing the eSIM to the first mobile device, and
causing the eSIM to be deleted from the second mobile device.

9. The non-transitory computer readable storage medium of claim 8, wherein the condition comprises (1) receiving, from the first mobile device, a request to download the eSIM, or (2) detecting that the first mobile device is without an active eSIM for a threshold amount of time, and the steps further include:
denying the request when the second mobile device does not return the eSIM to the server device.

10. The non-transitory computer readable storage medium of claim 8, wherein the usage status associated with the eSIM is stored in a database that is accessible to the server device, and the usage status indicates whether the eSIM is active or inactive.

11. The non-transitory computer readable storage medium of claim 10, wherein, when the eSIM is inactive, the eSIM is stored at the server device.

12. The non-transitory computer readable storage medium of claim 10, wherein, when the eSIM is active, the usage status further indicates a particular mobile device on which the eSIM is active.

13. The non-transitory computer readable storage medium of claim 12, wherein updating the database to reflect the usage status of the eSIM comprises:
updating a value of the usage status to indicate that the eSIM is active on the second mobile device.

14. The non-transitory computer readable storage medium of claim 8, wherein:
the first subset of wireless services corresponds to capabilities possessed by the first mobile device, and
the second subset of wireless services corresponds to capabilities possessed by the second mobile device.

15. A server device configured to transfer electronic Subscriber Identity Modules (eSIMs) between mobile devices, the server device comprising:
at least one processor; and
at least one memory configured to store instructions that, when executed by the at least one processor, cause the server device to carry out steps that include:
identifying a condition to provide, to a first mobile device, an eSIM included in a plurality of eSIMs managed by the server device;
referencing a usage status associated with the eSIM to identify whether the eSIM is being utilized by a second mobile device;
determining, in accordance with the usage status, that the eSIM is being utilized by the second mobile device, wherein the eSIM enables the second mobile device to access a second subset of wireless services selected from a set of wireless services associated with the eSIM;
prompting the second mobile device to return the eSIM to the server device; and
in response to receiving the eSIM from the second mobile device:
providing the eSIM to the first mobile device, wherein the eSIM enables the first mobile device to access a first subset of wireless services that is selected from the set wireless services and is distinct from the second subset of wireless services,
updating the usage status to reflect providing the eSIM to the first mobile device, and
causing the eSIM to be deleted from the second mobile device.

16. The server device of claim 15, wherein the condition comprises (1) receiving, from the first mobile device, a request to download the eSIM, or (2) detecting that the first mobile device is without an active eSIM for a threshold amount of time, and the steps further include:
denying the request when the second mobile device does not return the eSIM to the server device.

17. The server device of claim 15, wherein the usage status associated with the eSIM is stored in a database that is accessible to the server device, and the usage status indicates whether the eSIM is active or inactive.

18. The server device of claim 17, wherein, when the eSIM is inactive, the eSIM is stored at the server device.

19. The server device of claim 17, wherein, when the eSIM is active, the usage status further indicates a particular mobile device on which the eSIM is active.

20. The server device of claim 19, wherein updating the database to reflect the usage status of the eSIM comprises:
updating a value of the usage status to indicate that the eSIM is active on the second mobile device.

21. The server device of claim 15, wherein:
the first subset of wireless services corresponds to capabilities possessed by the first mobile device, and
the second subset of wireless services corresponds to capabilities possessed by the second mobile device.

* * * * *